United States Patent
Krimmer et al.

(10) Patent No.: US 6,415,817 B1
(45) Date of Patent: Jul. 9, 2002

(54) VALVE FOR DOSING THE ADMISSION OF VOLATILIZED FUEL

(75) Inventors: Erwin Krimmer, Pluederhausen; Wolfgang Schulz, Bietigheim-Bissingen; Tilman Miehle, Kernen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/646,187
(22) PCT Filed: Oct. 26, 1999
(86) PCT No.: PCT/DE99/03393
§ 371 (c)(1), (2), (4) Date: Nov. 3, 2000
(87) PCT Pub. No.: WO00/42312
PCT Pub. Date: Jul. 20, 2000

(30) Foreign Application Priority Data

Jan. 14, 1999 (DE) .......................... 199 01 090

(51) Int. Cl.[7] ............................................... F16K 31/02
(52) U.S. Cl. .................. 137/550; 251/118; 251/129.16; 251/129.21; 251/64
(58) Field of Search .................. 251/129.15, 129.16, 251/129.01, 64, 118; 137/550

(56) References Cited

U.S. PATENT DOCUMENTS

| | | | | |
|---|---|---|---|---|
| 5,560,585 A | * | 10/1996 | Krimmer et al. | ... 251/129.15 X |
| 5,630,403 A | * | 5/1997 | Van Kampen et al. | .... 251/129.17 X |
| 6,149,126 A | * | 11/2000 | Krimmer et al. | ... 251/129.21 X |

* cited by examiner

Primary Examiner—Kevin Lee
(74) Attorney, Agent, or Firm—Ronald E. Greigg (57) ABSTRACT

A magnet valve for tank venting in motor vehicles, having at least one valve opening forming a sealing seat and having a spring-loaded valve member cooperating with the at least one sealing seat for opening and closing the valve and actuated by an electromagnet counter to the restoring force of a restoring spring. Downstream of the valve member, a flow element that throttles the flow of a gas is disposed, the shape of the flow element is adapted to the opening cross section of the sealing seat that cooperates with the valve member, for determining (metering) the flow quantity of the gas through the cross section of the flow element when the magnet valve is open. The shape of the flow element is determined (metered) in such a way that the area of the opening cross section of the effective valve seat is greater than 2.5 and preferably greater than 9 times the area of the effective cross section of the flow element.

29 Claims, 6 Drawing Sheets

VALVE FOR DOSING THE ADMISSION OF VOLATILIZED FUEL

PRIOR ART

The invention relates to a valve for the metered introduction of fuel into engine in which the fuel is, volatilized from a fuel tank of an internal combustion engine.

Such valves are known for instance from German Patent Disclosures DE 40 23 044 A1 and DE 195 16 545 A1; they serve to regenerate adsorption filters for fuel vapor trapping systems for vehicle fuel tanks. These magnet valves have a hollow-cylindrical magnet core, which is joined to a valve seat body that forms the short-circuit yoke of the electromagnet, covers the magnet housing, and rests peripherally on an annular rib. Annular slits which form an opening cross section of defined size are disposed in the valve seat body.

Because of this structural design, a predeterminable volume of fuel vapors can be aspirated away, for a predetermined stroke of the valve member. This volume is defined by the maximum possible opening cross section of the hollow-cylindrical magnet core and of the opening slits in the valve seat. Slight variations can be compensated for by axial adjustment of the magnet core. Because of their structure, such valves are not suitable for large flow quantities, and in particular their use in direct gasoline injection engines is problematic.

German Patent DE 42 29 110 C1 discloses a device for temporary storage and metered feeding of volatile fuel components, located in the empty space of a tank system, into the intake tube of an internal combustion engine, in which the storage chamber communicates with the intake tube through a line that can be closed by a valve actuatable electromagnetically. The valve has one inlet opening and one outlet opening, and at least one valve seat that is closable by a closing member is provided between the inlet opening and the outlet opening. The valve seat forms the axial boundary of a tubular nozzle. In the region of the valve seat, this nozzle has a first opening cross section, which in the flow direction immediately downstream of the valve seat narrows to a second opening cross section. The second opening cross section is widened, on the side remote from the valve seat, in the region of the axial termination of the nozzle, to a third opening cross section that is larger than the first opening cross section.

In this device, the area of the first opening cross section is 1.01 to 2.5 times greater than the area of the second opening cross section. Because of these size ratios, quite a long valve stroke is required for pumping a certain predetermined quantity, which results in long opening and closing times. Furthermore, such a long stroke creates not inconsiderable background noise when the valve opens and closes.

The object of the invention is to further refine the valve of this generic type such that at large flow quantities, the valve functions with as little vulnerability to dirt and as noiselessly as possible, and that moreover the valve can be made economically and in particular can be used even in direct gasoline injection engines.

ADVANTAGES OF THE INVENTION

This object is attained, in a valve for the metered introduction of fuel volatilized from a fuel tank of an internal combustion engine, into the engine, of the type described at the outset. Because a flow element which throttles the flow of a gas and whose shape is adapted to the opening cross section of the sealing seat that cooperates with the valve member in such a way that the area of the opening cross section of the effective valve seat is greater than 2.5 and preferably greater than 9 times the area of the effective cross section of the flow element is disposed downstream of the valve member. It is possible, by the embodiment of the flow element and the sealing seat, for a predetermined stroke of the valve member, to set opening cross sections within wide limits, by adapting the opening cross section and the shape of the flow element to the opening cross section of the sealing seat. The above-indicated size ratios especially advantageously make it possible to attain a short valve stroke and thus short opening and closing times, with only slight background noise.

The flow element can be designed in the most various ways. In one advantageous embodiment, it is provided that the flow element is a throttle, whose cross section is smaller than the opening cross section of the sealing seat.

The flow element can furthermore also be a variable aperture, whose diameter is less than the opening cross section of the sealing seat.

Another advantageous embodiment contemplates a Laval nozzle, whose flow cross section is also smaller than the flow cross section of the sealing seat, as a flow element. With a Laval nozzle of this kind, in particular it is possible to generate an especially advantageous flow profile.

The seat element is preferably an armature plate, disposed in the valve member and forming part of the short-circuit yoke, on which advantageously elastic sealing and/or noise damping elements are disposed.

In an especially advantageous embodiment, it is provided that elastic damping elements protruding through the armature plate are disposed in the region of the sealing seat, and on the side toward the sealing seat the elastic damping elements have a sealing function and on the side toward the electromagnet the elements have a damping function. In this way, a sealing function can be combined with a damping function and thus especially the effort and expense of assembly for the sealing and damping elements and consequently the production costs can be reduced.

Another embodiment, which is especially advantageous in view of noise abatement in particular, provides that the seat element is an armature plate that includes two parts, which are embodied on one another, joined together, and provided with a sealing and/or noise damping element in such a way that a void is formed in the region of the sealing seat under the sealing and/or noise damping element. As a result of this void, the impact of the armature plate on the sealing seat is cushioned for the sake of reducing noise.

The impact of the armature plate, attracted by the electromagnet, on a pole plate of the electromagnet is advantageous cushioned by sealing and damping elements, which have a plurality of hollow-shaped rubber buttons which protrude through the armature plate and which upon opening of the valve, that is, when the armature plate is attracted by the electromagnet, strike the pole plate of the electromagnet.

In an especially advantageous embodiment of the invention, it is provided that the armature plate has a pressure equalization opening, which connects a void, embodied on one side of the armature plate toward the sealing seat, with a void (void toward the electromagnet) of the valve oriented toward the electromagnet and embodied on the other side of the armature plate. As a result, in an especially advantageous way, high switching frequencies are made possible, even in a valve with a sealing seat of especially large cross section. In valves with a large sealing seat, the prevailing differential pressure is in fact a problem, because it requires a very strong magnetic force if fast valve switching is to be made possible. Since the differential pressure in operation of the valve is dependent on the engine load of the vehicle, different attraction and closing times can result when the magnet force remains the same. By means of an armature plate that enables a pressure equalization, with a pressure equalization opening between a void toward the electromagnet and a void toward the sealing seat, a pressure equalization is made possible in a simple way.

The void embodied on the side of the armature plate toward the electromagnet is tightly closed off from the environment by an elastic sealing and damping element, which is secured to the magnet armature on its side toward the armature plate and executes a reciprocating motion together with the magnet armature.

The sealing and damping element protrudes the armature plate and thus advantageously also executes a sealing and damping function toward the sealing seat.

In order to preclude dirt particles and the like from reaching the interior of the valve during valve operation, an advantageous embodiment provides that a dirt trap concentrically surrounding the armature plate and is solidly structurally connected to the housing is provided, which traps dirt particles of predeterminable size in the opening direction of the valve and This dirt trap is preferably embodied in circular-annular form and has axially protruding, preferably cylindrical pins offset from one another. The pins are disposed adjacent one another in such a way that dirt particles of a predeterminable size are trapped by them.

BRIEF DESCRIPTION OF THE DRAWINGS

Further advantages and characteristics of the invention are the subject of the ensuing description and of the illustration of the exemplary embodiments in the drawings. Shown in the drawings are.

DESCRIPTION OF THE EXEMPLARY EMBODIMENTS

Figure 1:
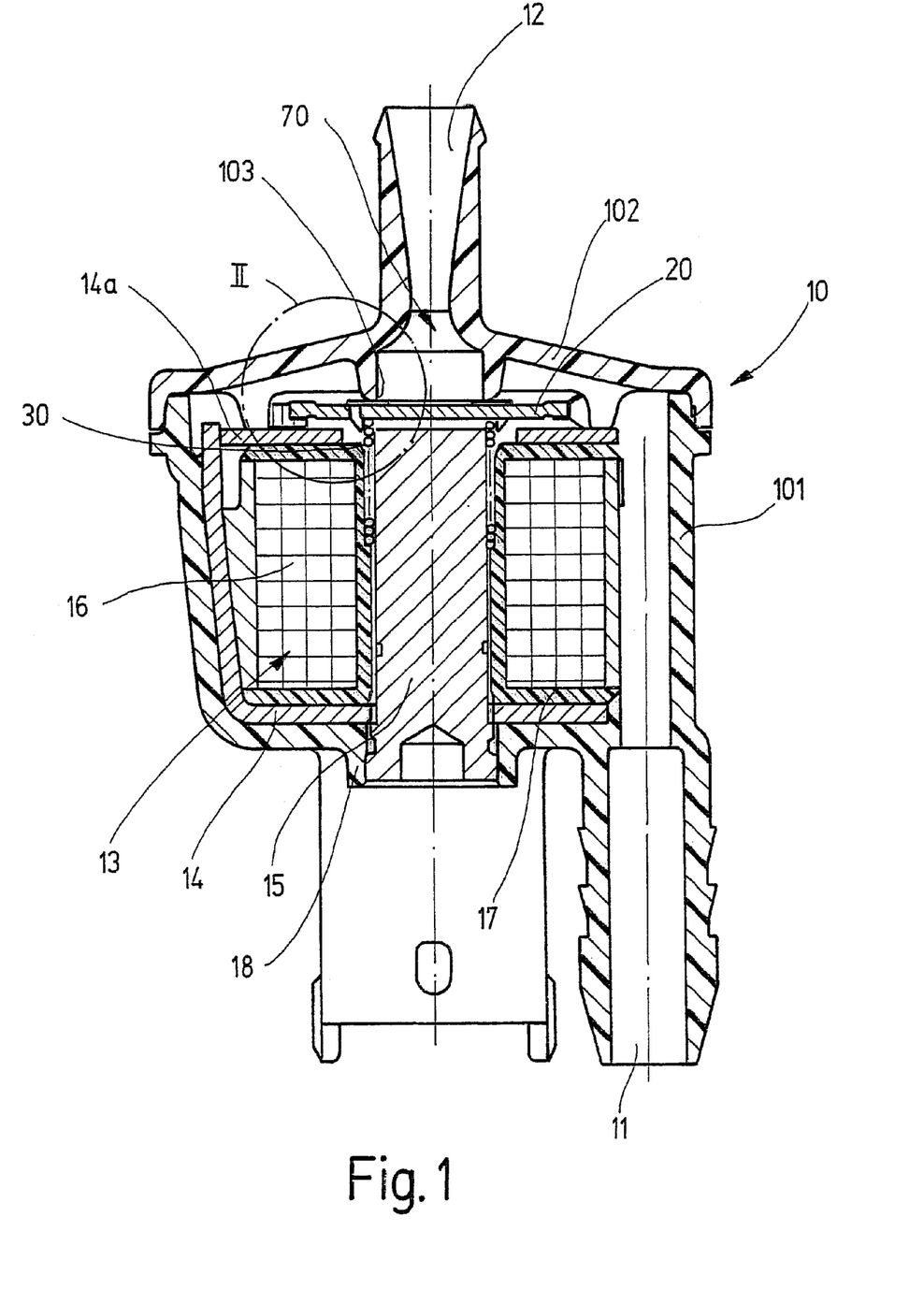
FIG. 1, schematically, a section taken along the line I—I of FIG. 3 through a valve according to the invention.

A tank venting valve, shown in longitudinal section in FIG. 1 as an exemplary embodiment of an arbitrary magnet valve, serves to provided metered admixture of fuel, volatilized from the fuel tank of a mixture-compressing internal combustion engine (not shown) with externally supplied ignition, into the engine, for instance into an intake tube, or in the case of direct gasoline injection, directly into a cylinder of the engine, and is part of a fuel vapor trapping system, not shown in further detail, of an internal combustion engine. The structure and function of such fuel vapor trapping systems can be learned for instance from "Bosch Technische Unterrichtung Motormanagement Motronic" [Bosch Technical Instruction Manual, Motronic Motor Management], 2nd Edition, August 1993, pp. 48 and 49. A tank venting valve and its function are disclosed for instance by German Patent Disclosures DE 40 23 044 A1 and DE 195 16 545 A1, which are hereby incorporated by reference.

The tank venting valve has a two-part valve housing 10 with a cup-shaped housing part 101 and a caplike housing part 102 closing the housing valve off. The housing part 101 has an inflow neck 11 for connection to a venting stub of the fuel tank or to an activated charcoal-filled reservoir, downstream of the tank, for the volatilized fuel. The housing part 102 has an outflow neck 12 for connection to the intake tube of the engine. The inflow neck 11 and outflow neck 12 are each disposed in the axial direction in the respective housing parts 101, 102. An electromagnet 13 is disposed in the interior of the cup-shaped housing part 101. The electromagnet 13 has a cup-shaped magnet housing 14, with a cylindrical magnet core 15 that is coaxial with the valve access and penetrates the cup bottom, and with a cylindrical exciter coil 16, which is seated on a coil carrier 17 that surrounds the magnet core 15 in the magnet housing 14. An outward-protruding threaded neck 18 with a female thread is embodied on the bottom of the magnet housing 14 and is screwed to a male-threaded portion of the hollow-cylindrical magnet core 15. The magnet core can thus be displaced axially for adjustment purposes by rotation in the magnet housing 14. It can be provided that the magnet core 15 is provided with a self-tapping thread, which is cut into the threaded neck 18, for instance during assembly.

On its side toward the outflow neck 12, an armature plate 20 that is prestressed counter to the restoring force of a restoring spring 30 is provided; it is attracted by the electromagnet 13 and forms a valve member which comes to rest on a sealing seat 103 that is disposed either directly or indirectly on the housing 102. As seen particularly from FIG. 2, an elastomer sealing and damping element 40 is disposed in the region of the sealing seat 103. The armature plate 20 also peripherally has a further damping element 41. The damping elements 40 and 41 serve on the one hand to abate noise upon impact of the armature plate 20 on the pole plate 14a, disposed in this region, of the magnet housing 14, and on the other hand, the sealing and damping element 40 also serves as a sealing element on the valve seat 103.

As seen particularly from FIG. 1, the outflow neck 12 has a flow element 70 in the form of a Laval nozzle. However, it is understood that the flow element is not limited to a Laval nozzle and can also be embodied as a variable aperture or as a throttle. The flow element 70 is embodied such that the area of its narrowest flow cross section is smaller than the area of the opening cross section of the sealing seat 103. This opening cross section of the sealing seat 103 has a cylindrical shape, whose cylinder diameter is determined by the diameter of the sealing seat 103 and whose height is determined by the spacing of the armature plate 20 from the sealing seat 103 when the armature plate 20 is attracted. The cylindrical opening cross section can be defined by axially adjusting the magnet core 15. The flow quantity through the valve is determined by the area of the cross section of the flow element 70, and in this embodiment shown by the cross section of the Laval nozzle, which is smaller than the area of the cross section of the sealing seat 103. The area of the cross section of the sealing seat 103 is approximately 9 times greater than the area of the effective cross section of the flow element, which in the case of the Laval nozzle is determined by its smallest cross section. These size ratios make a short valve stroke and thus short opening and closing times and low noise generation upon opening and closure of the valve member possible.

The working air gap of the magnet valve can be varied as a function of the design of the sealing seat 103. The valve closing times can be varied and adjusted to compensate for component tolerances by means of the adjustable magnet core 15.

Figure 5:
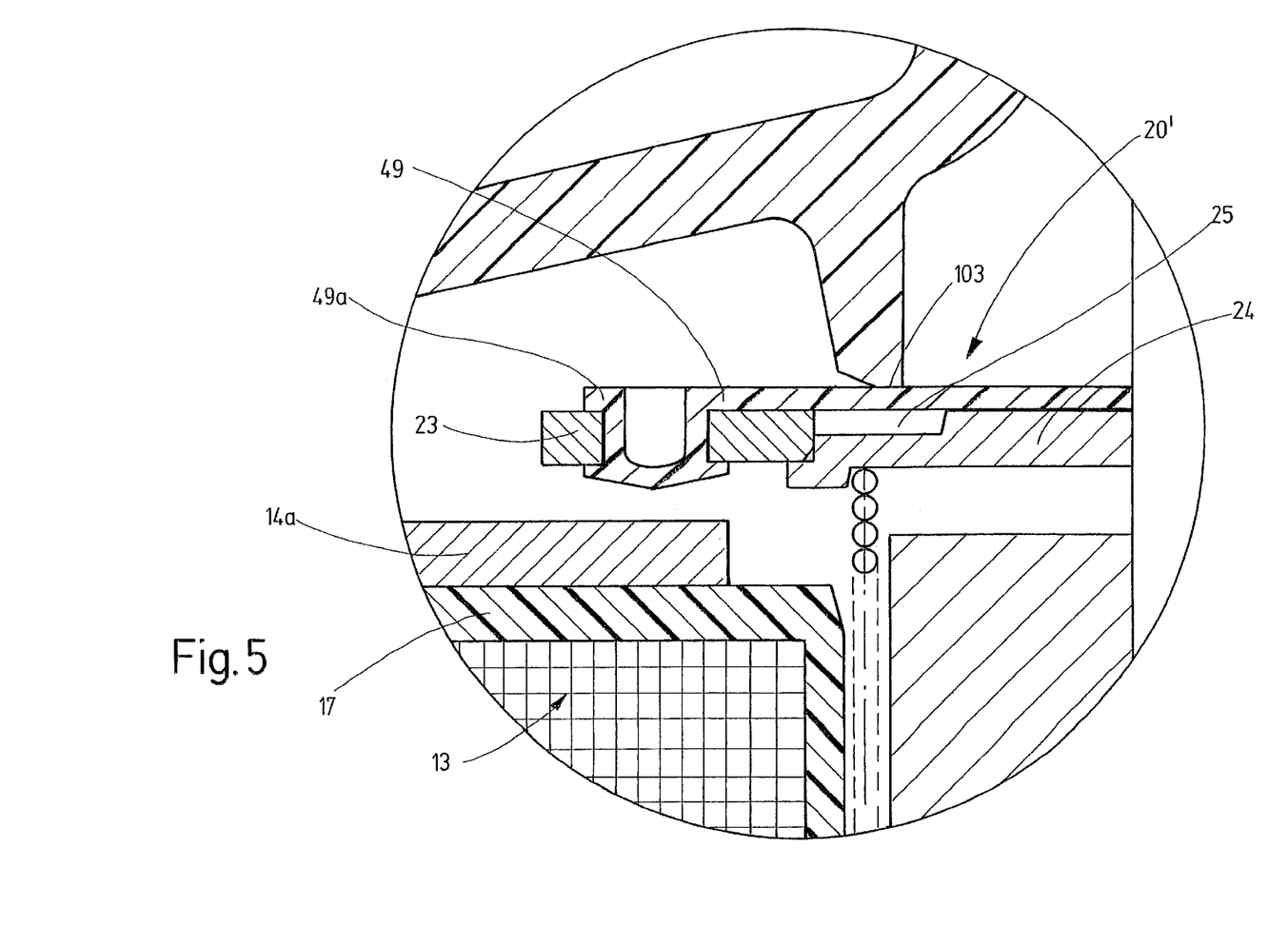
FIG. 5, an enlarged detail, corresponding to FIG. 2, for another embodiment of the valve of the invention.

For further noise reduction, the armature plate 20' can be composed as shown in FIG. 5 of two joined-together components 23, 24, which are provided with a sealing and noise damping element 49 in such a way that in the region of the sealing seat 103, a void 25 is formed between these three parts 23, 24 and 49, and is covered toward the sealing seat 103 by the sealing and noise damping element 49. By means of the void 25, the impact of the armature plate 20' on the sealing seat 103 can be cushioned for the sake of noise reduction. An impact of the armature plate 20' on the pole plate 14a is cushioned by hollow-shaped buttons 49a of elastomer material, such as rubber buttons. In this embodiment, the armature plate 20, 20' moves between fixed stops (the sealing seat 103 and the pole plate 14a). To adjust the attraction time, the magnet core 15 can be adjusted to a defined working air gap such that a residual air gap remains between the armature plate 20, 20' and the magnet core 15, in order to prevent a mechanical impact of the armature plate 20, 20' with the magnet core 15. Torsional securing of the magnet core 15 is attained by means of a self-tapping thread, which is additionally cut into the coil body 17 upon assembly.

Figure 2:
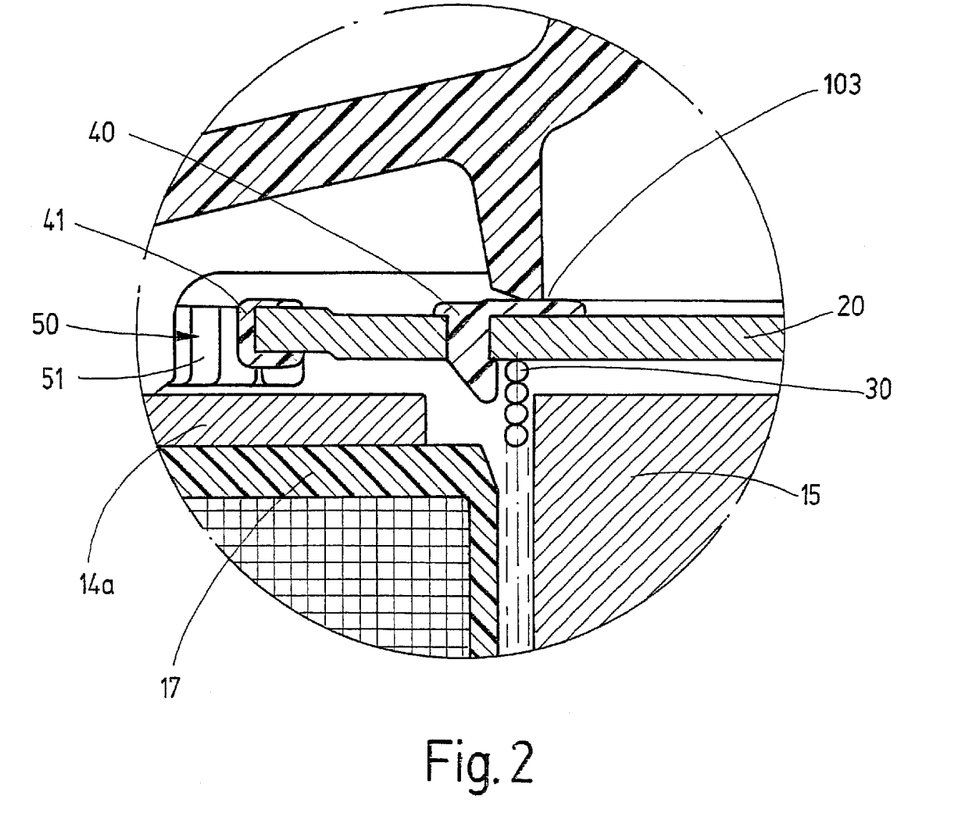
FIG. 2, an enlarged detail marked II in FIG. 1.
Figure 3:
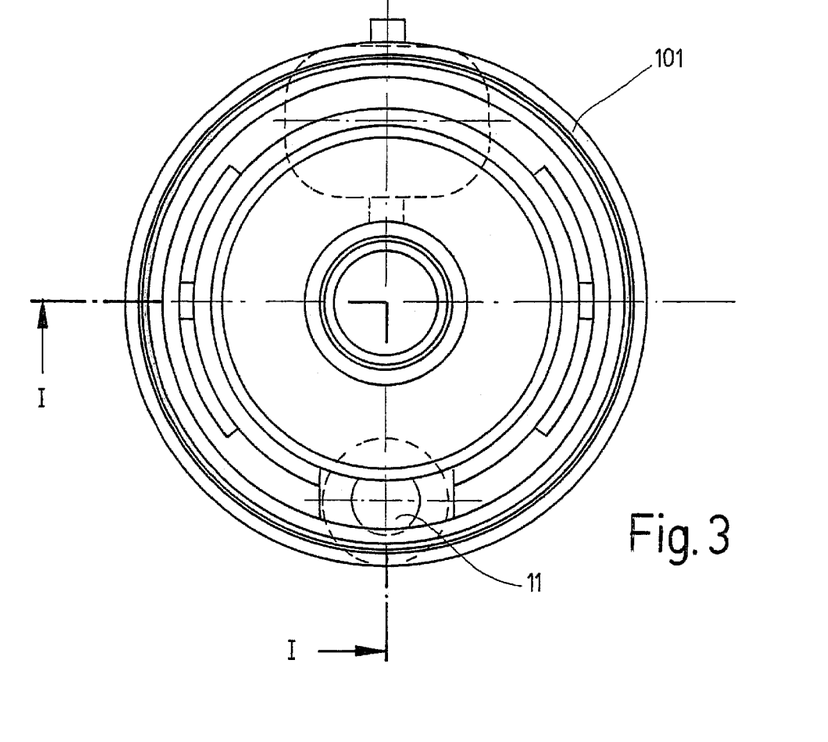
FIG. 3, the plan view on a magnet housing of the valve shown in FIG. 1.
Figure 4:
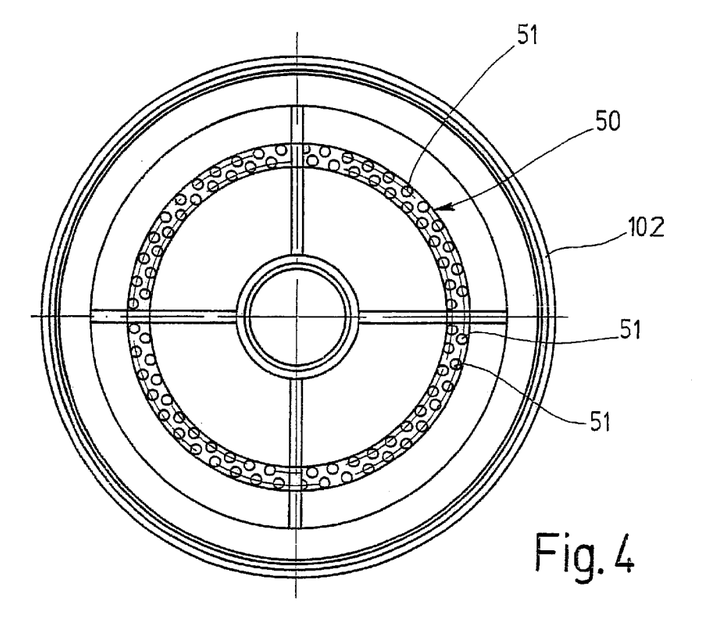
FIG. 4, the view from below of a lid element of the valve shown in FIG. 1.

As seen particularly from FIG. 2 and FIG. 4, a dirt trap 50 structurally connected to the housing and surrounding the armature plate 20 is furthermore provided, which traps dirt particles of predeterminable size. The dirt trap 50 is held by pressure between the two housing parts 101 and 102; it has axially protruding, preferably cylindrical dirt trapping pins 51, offset from one another, on which particles of predeterminable size are caught, and thus prevented from penetrating into the interior of the valve in a suction removal operation.

Figure 6:
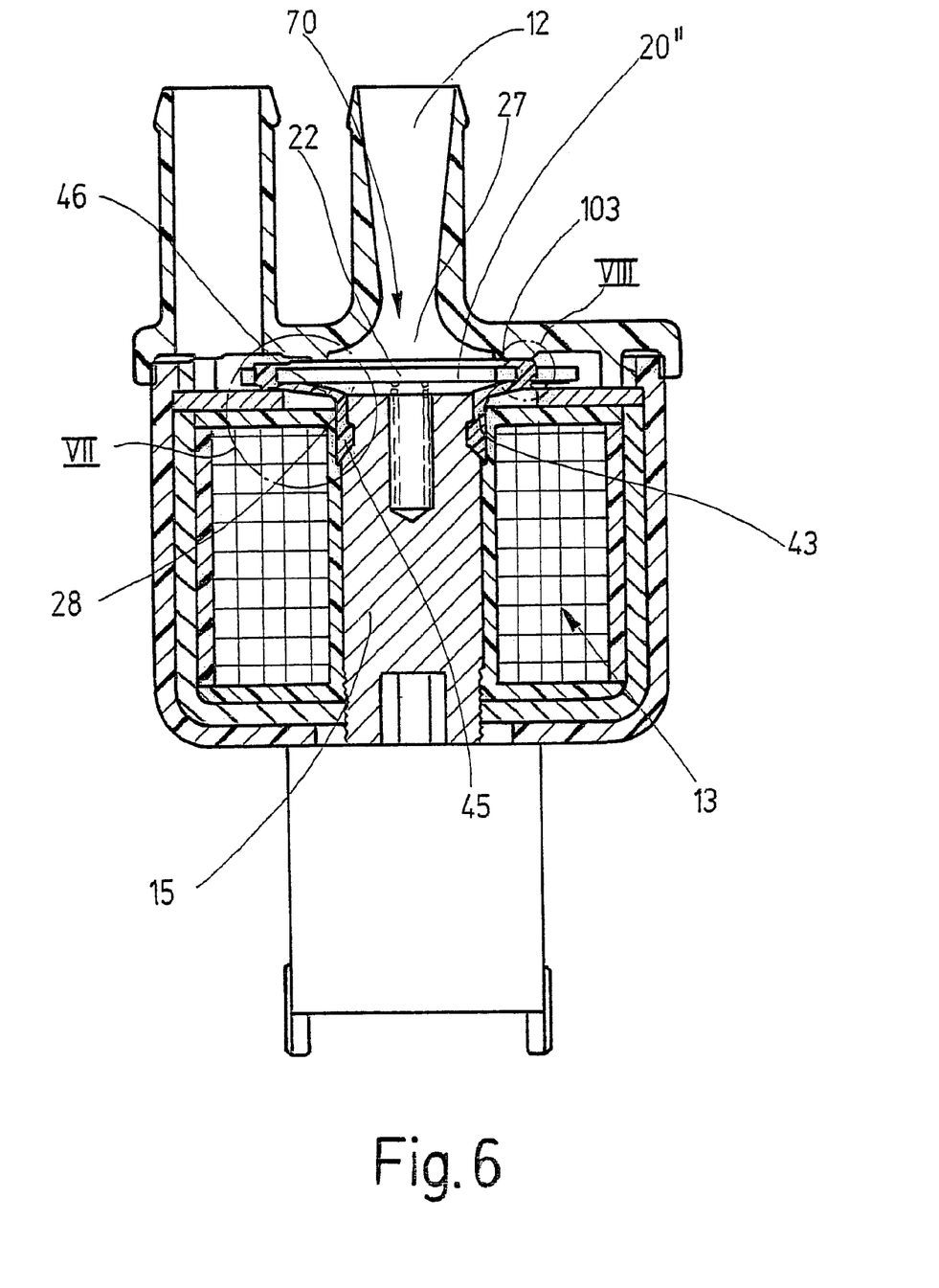
FIG. 6, a schematic sectional view of another embodiment of a valve of the invention.
Figure 7:
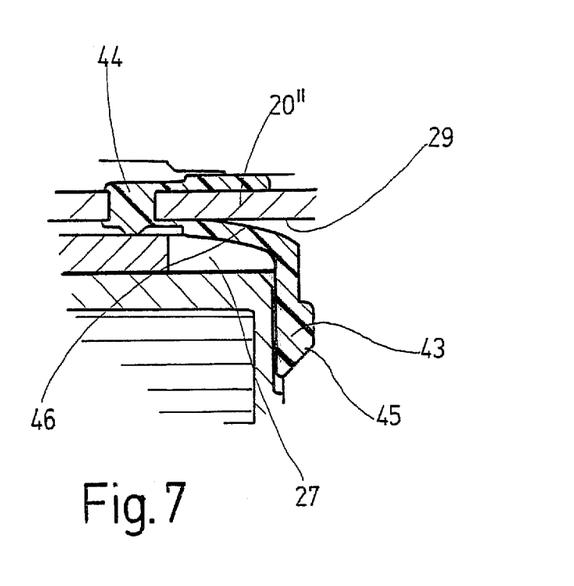
FIG. 7, an enlarged detail marked VII in FIG. 6.
Figure 8:
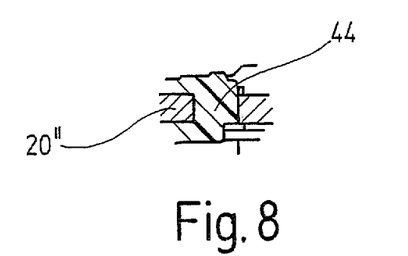
FIG. 8, an enlarged detail marked VIII in FIG. 6.
Figure 9:
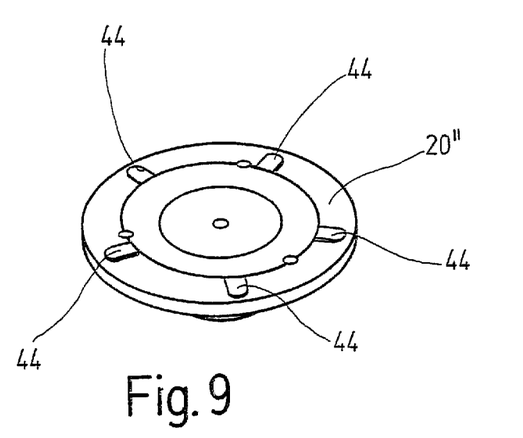
FIG. 9, a perspective view of an armature disk used in the valve shown in FIG. 6.

In a second exemplary embodiment, shown in FIGS. 6–8, those elements that are identical to those of the first exemplary embodiment, shown in FIGS. 1–5, are provided with the same reference numerals, so that in terms of their description, the full content of the above descriptions applies.

In contrast to the first exemplary embodiment described in conjunction with FIGS. 1–5, the second exemplary embodiment described in FIGS. 5–8 has an armature plate 20" with a centrally disposed pressure equalization opening 22, which connects a void 27 on the side toward the sealing seat to a void disposed on the side of the armature plate 20" toward the electromagnet (void on the side toward the electromagnet) 28. The void 27 toward the sealing seat communicates with the outflow neck 12. The void 28 toward the electromagnet is tightly closed off from the environment by a sealing and damping element 43 secured to the armature plate 20". The sealing and damping element 43 protrudes through the armature plate 20" at five locations 44, preferably offset from one another by the same angle. The sealing and damping element 43 is mounted tightly on the armature plate 20" by being vulcanized on, and on the side of the armature plate 20" toward the magnet core 15, and before the elastomer sealing and damping element 43 is vulcanized on, a parting means is applied to the side of the armature plate 20" toward the magnet core 15, so that the sealing and damping element 43 is not vulcanized on in this region but instead remains movable.

As seen from FIG. 6 and particularly from FIG. 7, the sealing and damping element 43 has a protrusion 45, disposed radially inward, which protrudes into a recess, formed complimentary to it, of the magnet core 15 and is secured to the magnet core 15. Upon a motion of the armature plate 20", by axial motion of an elastic region 46 of the sealing and damping element 43, it is assured that the void 28 oriented toward the magnet core 15 is sealed off from the environment. The pressure equalization opening 22 and the sealing element 43 assure that the void 28 toward the magnet core communicates in pressure-equalized fashion with the void 27 toward the sealing seat and thus with the outflow neck 12. As a result of this pressure equalization, upon attraction of the armature plate 20" only the restoring force of the restoring spring 30 and a slight compressive force, possibly acting upon one part of the sealing element 43, have to be overcome, but a differential pressure that would arise between the void 28 toward the electromagnet and the void 27 toward the valve seat and would act on the faces of the armature plate 20" on both sides if there were no equalization opening 22 does not have to be overcome. Such a differential pressure arises in operation of the valve and is dependent on the engine load. At a high differential pressure, a high magnetic force would have to be exerted, were it not for the above-described equalization bore 22 in the armature plate 20".

By the described embodiment of the armature plate 20" with the equalization opening 22, the force to be brought to bear on the electromagnet for attracting the armature plate 20" is substantially more independent from the differential pressure. As a result, the electromagnet can be made smaller. The valve attraction and closing time becomes virtually independent of the various differential pressures of the engine. This increases the precision of metering of the regeneration gas over the entire pressure range.

The foregoing relates to a preferred exemplary embodiments of the invention, it being understood that other variants and embodiments thereof are possible within the spirit and scope of the invention, the latter being defined by the appended claims.

We claim:

1. A magnet valve for fuel tank venting in motor vehicles, said valve comprising at least one valve opening that forms a sealing seat (103), a spring-loaded valve member (20, 20', 20") that cooperates with the at least one sealing valve seat (103) for opening and closing the valve opening and actuated by an electromagnet counter to a restoring force of a restoring spring (30), a flow element (70) that throttles the flow of a gas is disposed downstream of the valve member, a shape of the the flow element (70) is adapted to an opening cross section of the sealing valve seat (103) that cooperates with valve member (20, 20', 20"), for determining a flow quantity of the gas through the cross section of the flow element (70) when the magnet valve is open; and an area of the opening cross section of the valve seat (103) is at least 2.5 times greater than the area of the cross section of the flow element (70).

2. The valve of claim 1, in which the flow element (70) is a throttle, whose cross section is smaller than an opening cross section of the sealing valve seat (103).

3. The valve of claim 1, in which the flow element (70) is a variable aperture, whose diameter is less than the opening cross section of the sealing valve seat (103).

4. The valve of claim 1, in which the flow element (70) is a Laval nozzle, whose cross section is smaller than an opening cross section of the sealing valve seat (103).

5. The valve of claim 1, in which the valve member is an armature plate (20, 20', 20") that forms part of a short-circuit yoke.

6. The valve of claim 5, in which elastic sealing and noise damping elements (40, 41, 43) are disposed on the armature plate (20).

7. The valve of claim 6, in which the elastic damping elements (40) that protrude through the armature plate (20) are disposed in a region of the sealing valve seat (103), and on a first side of the armature plate toward the sealing valve seat (103) the elastic elements have a sealing function and on a second side of the armature plate toward the electromagnet (13) the elastic elements have a damping function.

8. The valve of claim 1, in which the valve member is an armature plate (20') that includes two parts (23, 24), the two parts (23, 24) of the armature plate being embodied on one another, joined together, and provided with a sealing and noise damping element (49) in such a way that a void (25) is formed in a region of the sealing valve seat (103) under the sealing and noise damping element (49).

9. The valve of claim 2, in which the valve member is an armature plate (20') that includes two parts (23, 24), the two parts (23, 24) of the armature plate being embodied on one another, joined together, and provided with a sealing and noise damping element (49) in such a way that a void (25) is formed in a region of the sealing valve seat (103) under the sealing and noise damping element (49).

10. The valve of claim 8, in which the sealing and noise damping element has a plurality of hollow-shaped rubber buttons (49a) that protrude through at least one of the two parts (23) of the armature plate (20) and that upon opening of the valve the rubber buttons strike a pole plate (14a) of the electromagnet.

11. The valve of claim 9, in which the sealing and noise damping element has a plurality of hollow-shaped rubber buttons (49a) that protrude through at least one of the two parts (23) of the armature plate (20) and that upon opening of the valve the rubber buttons strike a pole plate (14a) of the electromagnet.

12. The valve of claim 5, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

13. The valve of claim 6, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

14. The valve of claim 7, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

15. The valve of claim 12, in which the second void (28) toward the electromagnet is defined by an elastic sealing and damping element (43), which is secured to a magnet core on a side toward the armature plate (20") and is deformable by a stroke motion of the armature plate (20").

16. The valve of claim 15, in which the sealing and damping element (43) protrudes through the armature plate (20") and also has a sealing and damping function on a side toward the sealing valve seat (103).

17. The valve of claim 1, in which a dirt trap (50), which traps dirt particles of a predeterminable size, is provided, concentrically surrounding the valve member (20; 20', 20") and structurally connected to the housing.

18. The valve of claim 2, in which a dirt trap (50), which traps dirt particles of a predeterminable size, is provided, concentrically surrounding the valve member (20; 20', 20") and structurally connected to the housing.

19. The valve of claim 17, in which the dirt trap (50) is embodied in circular-annular form and has axially protruding, cylindrical dirt trapping pins (51) offset from one another.

20. The valve of claim 18, in which the dirt trap (50) is embodied in circular-annular form and has axially protruding, cylindrical dirt trapping pins (51) offset from one another.

21. The valve of claim 1, in which the area of the opening cross section of the valve seat (103) is at least nine times greater than the area of the cross section of the flow element (70).

22. The valve of claim 21, in which the valve member is an armature plate (20, 20', 20") that forms part of a short-circuit yoke.

23. The valve of claim 22, in which elastic sealing and noise damping elements (40, 41, 43) are disposed on the armature plate (20).

24. The valve of claim 23, in which the elastic damping elements (40) that protrude through the armature plate (20) are disposed in a region of the sealing valve seat (103), and on a first side of the armature plate toward the sealing valve seat (103) the elastic elements have a sealing function and on a second side of the armature plate toward the electromagnet (13) the elastic elements have a damping function.

25. The valve of claim 22, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

26. The valve of claim 23, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

27. The valve of claim 24, in which the armature plate (20") has a pressure equalization opening (22), which connects a first void (27), embodied on one side of the armature plate toward the sealing valve seat, with a second void (28) of the valve oriented toward the electromagnet (13) and embodied on another side of the armature plate (20").

28. The valve of claim 25, in which the second void (28) toward the electromagnet is defined by an elastic sealing and damping element (43), which is secured to a magnet core on a side toward the armature plate (20") and is deformable by a stroke motion of the armature plate (20").

29. The valve of claim 28, in which the sealing and damping element (43) protrudes through the armature plate (20") and also has a sealing and damping function on a side toward the sealing valve seat (103).

* * * * *